(12) United States Patent
Muta

(10) Patent No.: US 10,981,560 B2
(45) Date of Patent: Apr. 20, 2021

(54) HYBRID VEHICLE

(71) Applicant: TOYOTA JIDOSHA KABUSHIKI KAISHA, Toyota (JP)

(72) Inventor: Koichiro Muta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 16/658,806

(22) Filed: Oct. 21, 2019

(65) Prior Publication Data

US 2020/0164862 A1 May 28, 2020

(30) Foreign Application Priority Data

Nov. 22, 2018 (JP) .............................. JP2018-219434

(51) Int. Cl.
*B60W 20/14* (2016.01)
*B60W 30/18* (2012.01)
*H02P 5/68* (2006.01)

(52) U.S. Cl.
CPC ...... *B60W 20/14* (2016.01); *B60W 30/18127* (2013.01); *H02P 5/68* (2013.01); *B60W 2510/244* (2013.01)

(58) Field of Classification Search
CPC ...... B60W 10/06; B60W 10/08; B60W 10/18; B60W 10/26; B60W 20/14; B60W 20/16; B60W 20/20; B60W 20/40; B60W 20/30; B60W 20/18127; B60W 2510/18; B60W 2510/244; B60W 2510/246; B60W 2540/10; B60W 2710/06; B60W 2710/0616; B60W 2710/0627; B60W 2710/08; H02P 5/68
See application file for complete search history.

(56) References Cited

U.S. PATENT DOCUMENTS

| 5,327,992 | A | * | 7/1994 | Boll | B60K 6/547 |
| | | | | | 180/65.25 |
| 2017/0009675 | A1 | * | 1/2017 | Shin | B60K 6/485 |
| 2018/0126979 | A1 | | 5/2018 | Higa et al. | |
| 2018/0156098 | A1 | * | 6/2018 | Miyaji | F01N 11/00 |
| 2019/0023261 | A1 | * | 1/2019 | Kanayama | F01N 3/023 |
| 2019/0071067 | A1 | * | 3/2019 | Leone | F02D 41/3005 |

FOREIGN PATENT DOCUMENTS

| JP | 2002-238105 A | 8/2002 |
| JP | 2017-128152 A | 7/2017 |
| JP | 2017-149233 A | 8/2017 |
| JP | 2018-075919 A | 5/2018 |

* cited by examiner

*Primary Examiner* — Edwin A Young
(74) *Attorney, Agent, or Firm* — Sughrue Mion, PLLC

(57) ABSTRACT

There is provided a hybrid vehicle that suppresses overdischarge of a power storage device. In the case where a braking force is applied to drive wheels accompanied with regenerative driving of a second motor in an accelerator-off state upon satisfaction of a filter regeneration condition, when a state of charge of a power storage device is equal to or higher than a reference value, an engine and a first motor are controlled such as to perform fuel cutting of the engine and motoring of the engine by the first motor. When the state of charge of the power storage device is lower than the reference value, on the other hand, the engine is controlled such as to perform self-sustained operation or rotation stop of the engine.

6 Claims, 5 Drawing Sheets

HYBRID VEHICLE

CROSS-REFERENCE TO RELATED APPLICATION

This application claims priority to Japanese Patent Application No. 2018-219434 filed on Nov. 22, 2018, the contents of which is incorporated herein by reference.

TECHNICAL FIELD

The present disclosure relates to a hybrid vehicle and more specifically relates to a hybrid vehicle including an engine equipped with a filter that is placed in an exhaust system and that is configured to remove particulate matter.

BACKGROUND

A proposed hybrid vehicle is configured such that an engine equipped with a filter placed in an exhaust system and configured to remove particulate matter, a first motor, and a second motor connected with drive wheels are respectively connected with a carrier, a sun gear and a ring gear of a planetary gear and that a battery is connected with the first motor and the second motor via power lines (as described in, for example, JP 2018-75919A). In an accelerator-off state, when a required braking force is not coverable by regenerative driving of the second motor in a range of an allowable input power of the battery, this hybrid vehicle controls the engine, the first motor and the second motor such that the required braking force is covered by regenerative driving of the second motor, fuel cutting of the engine and motoring of the engine by the first motor. The allowable input power of the battery is set to provide a smaller value upon satisfaction of filter regeneration conditions, compared with a value upon no satisfaction of the filter regeneration conditions. This configuration facilitates fuel cutting of the engine in the accelerator-off state upon satisfaction of the filter regeneration conditions. Performing fuel cutting of the engine causes the air (oxygen) to be supplied to the filter and to burn the particulate matter accumulated on the filter and thereby achieves regeneration of the filter.

CITATION LIST

Patent Literature

PTL 1: JP2018-075919A

In the accelerator-off state upon satisfaction of the filter regeneration conditions, performing fuel cutting of the engine to regenerate the filter without taking into account the state of charge of the battery as described above is, however, likely to excessively decrease the state of charge of the battery and to cause overdischarge of the battery.

A main object of the hybrid vehicle of the present disclosure is to suppress overdischarge of a power storage device.

SUMMARY

In order to achieve the above primary object, the electrically driven vehicle of the disclosure is implemented by an aspect described below.

The present disclosure is directed to a hybrid vehicle. The hybrid vehicle includes an engine equipped with a filter that is placed in an exhaust system and that is configured to remove particulate matter, a first motor connected with an output shaft of the engine, a second motor connected with drive wheels, a power storage device configured to transmit electric power to and from the first motor and the second motor, and a control device configured to control the engine, the first motor and the second motor. In a case where a braking force is applied to the drive wheels accompanied with regenerative driving of the second motor in an accelerator-off state upon satisfaction of a regeneration condition of the filter, the control device controls the engine and the first motor such as to perform fuel cutting of the engine and motoring of the engine by the first motor, when a state of charge of the power storage device is equal to or higher than a reference value, and the control device controls the engine such as to perform self-sustained operation or rotation stop of the engine, when the state of charge of the power storage device is lower than the reference value.

In the case where the braking force is applied to the drive wheels accompanied with regenerative driving of the second motor in the accelerator-off state upon satisfaction of the filter regeneration condition, when the state of charge of the power storage device is equal to or higher than the reference value, the hybrid vehicle of this aspect controls the engine and the first motor such as to perform fuel cutting of the engine and motoring of the engine by the first motor. When the state of charge of the power storage device is lower than the reference value, on the other hand, the hybrid vehicle of this aspect controls the engine such as to perform self-sustained operation or rotation stop of the engine. In the former case, this control causes the air (oxygen) to be supplied to the filter and thereby achieves regeneration of the filter. In the latter case, this control suppresses the state of charge of the power storage device from being excessively decreased and thereby suppresses overdischarge of the power storage device.

DESCRIPTION OF EMBODIMENTS

The following describes some aspects of the present disclosure with reference to an embodiment.

Figure 1:
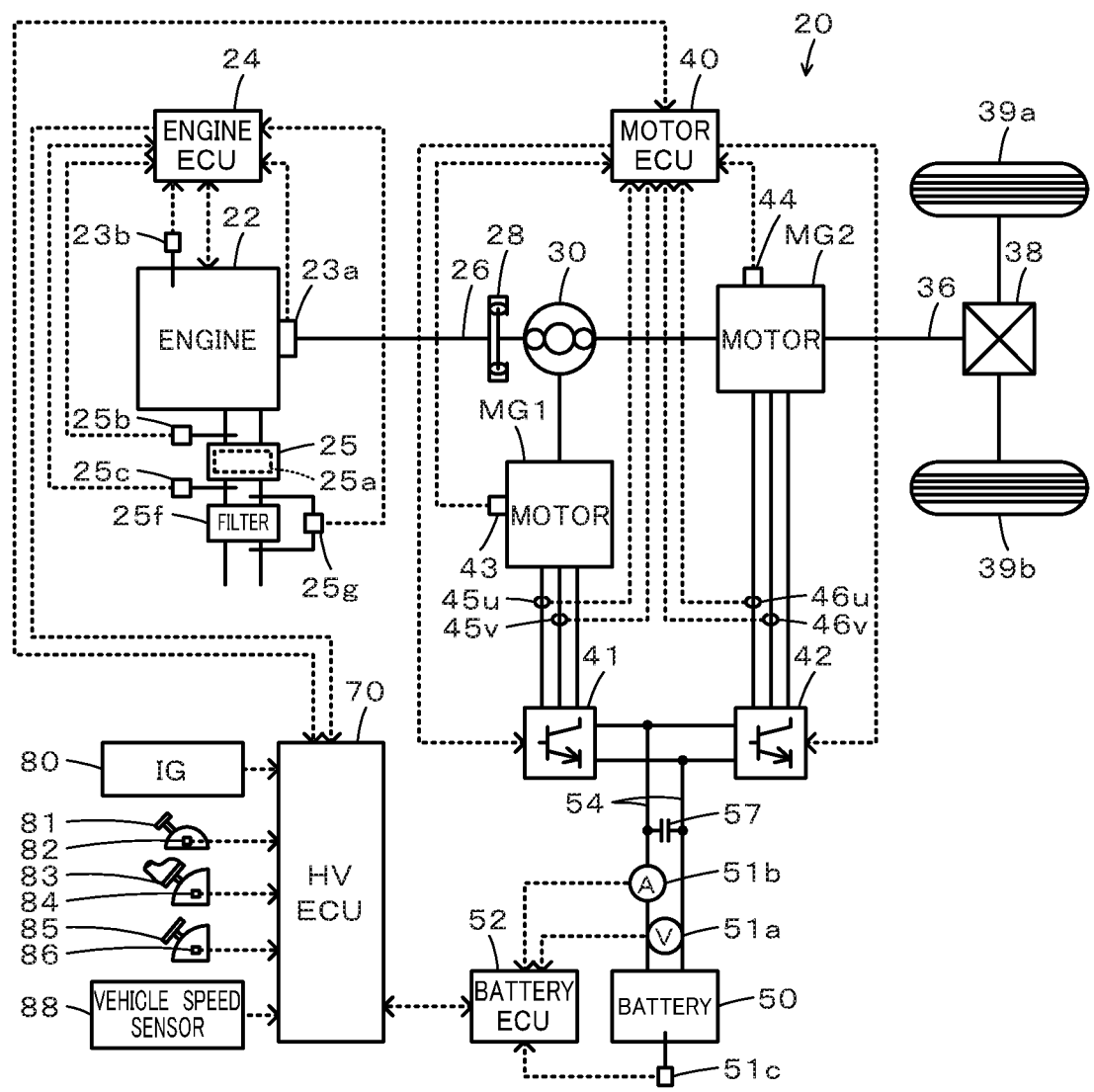
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50 serving as a power storage device, and a hybrid electronic control unit (hereinafter referred to as "HVECU") 70.

The engine 22 is configured as an internal combustion engine that outputs power using, for example, gasoline or light oil as a fuel, and is connected with a carrier of the planetary gear 30 via a damper 28. An exhaust system of the engine 22 is provided with a purification system 25 and a particulate matter removal filter (hereinafter referred to as "PM filter") 25f. The purification system 25 is filled with a catalyst 25a that works to convert the unburnt fuel and nitrogen oxides included in the exhaust emission of the engine 22. The PM filter 25f is provided as a porous filter formed from a ceramic material or a stainless steel material and serves to trap particulate matter (PM) such as soot included in the exhaust emission. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle θcr from a crank position sensor 23a configured to detect the rotational position of a crankshaft 26 of the engine 22, and a cooling water temperature Tw from a water temperature sensor 23b configured to detect the temperature of cooling water of the engine 22. The input signals also include an air fuel ratio AF from an air fuel ratio sensor 25b placed on an upstream side of the purification system 25 in the exhaust system of the engine 22, and an oxygen signal O2 from an oxygen sensor 25c placed on a downstream side of the purification system 25 in the exhaust system of the engine 22. The input signals additionally include a differential pressure ΔP from a differential pressure sensor 25g configured to detect a differential pressure before and after the PM filter 25f (differential pressure between the upstream side and the downstream side). Various control signals for operation control of the engine 22 are output from the engine ECU 24 via the output port. The engine ECU 24 is connected with the HVECU 70 via the respective communication ports.

The engine ECU 24 calculates a rotation speed Ne of the engine 22, based on the crank angle θcr input from the crank position sensor 23a. The engine ECU 24 also calculates (estimated) a temperature Tc of the catalyst 25a (catalyst temperature Tc), based on, for example, the cooling water temperature Tw input from the water temperature sensor 23b. The engine ECU 24 also calculates a volumetric efficiency KL (the ratio of the volume of the actual intake air in one cycle to the stroke volume of the engine 22 per cycle), based on an intake air flow Qa from an air flowmeter (not shown) and the calculated rotation speed Ne of the engine 22. The engine ECU 24 further calculates a PM accumulation amount Qpm that is the amount of the particulate matter accumulated on the PM filter 25f, based on the differential pressure ΔP input from the differential pressure sensor 25g. The engine ECU 24 also calculates a filter temperature Tf that is the temperature of the PM filter 25f, based on the rotation speed Ne of the engine 22 and the calculated volumetric efficiency KL.

The planetary gear 30 is configured as a single pinion-type planetary gear mechanism and includes a sun gear, a ring gear, a plurality of pinion gears arranged to respectively engage with the sun gear and the ring gear, and a carrier arranged to support the plurality of pinion gears such that the pinion gears are rotated and revolved about the carrier. The sun gear of the planetary gear 30 is connected with a rotor of the motor MG1. The ring gear of the planetary gear 30 is connected with a driveshaft 36 that is linked with drive wheels 39a and 39b via a differential gear 38. The carrier of the planetary gear 30 is connected with the crankshaft 26 of the engine 22 via the damper 28 as described above. It may thus be expressed that the motor MG1, the engine 22, and the driveshaft 36 along with the motor MG2 are respectively connected with the three rotational elements, i.e., the sun gear, the carrier and the ring gear of the planetary gear 30, such as to be aligned in this sequence in an alignment chart of the planetary gear 30.

The motor MG1 may be configured, for example, as a synchronous generator motor and includes the rotor that is connected with the sun gear of the planetary gear 30 as described above. The motor MG2 is configured as, for example, a synchronous generator motor and has a rotor that is connected with the driveshaft 36. The inverters 41 and 42 are used to drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) included in the respective inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2, are input into the motor ECU 40 via the input port. The motor ECU 40 outputs, via the output port, for example, switching control signals to the plurality of switching elements included in the respective inverters 41 and 42. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The battery ECU 52 also calculates an input limit Win and an output limit Wout of the battery 50, based on the calculated state of charge SOC and the temperature Tb of the battery 50 input from the temperature sensor 51c. The state of charge SOC denotes a ratio of the capacity of electric power dischargeable from the battery 50 to the overall capacity of the battery 50. The input limit Win and the output limit Wout respectively denote an allowable input power chargeable into the battery 50 and an allowable output power dischargeable from the battery 50.

For example, a procedure employed to set the input limit Win and the output limit Wout of the battery 50 may set respective base values Wintmp and Wouttmp of the input limit Win and the output limit Wout, based on the temperature Tb of the battery 50, set correction factors kin and kout, based on the state of charge SOC of the battery 50, multiply the set base values Wintmp and Wouttmp by the set correction factors kin and kout, and set the obtained products as the input limit Win and the output limit Wout. More specifically, the output limit Wout of the battery 50 decreases with an increase in separation of the temperature Tb of the battery 50 toward the lower side from an allowable temperature range of the battery 50 and decreases with a decrease in state of charge SOC of the battery 50. The input limit Win of the battery 50 increases (decreases as an absolute value) with an increase in separation of the temperature Tb of the battery 50 toward the lower side from the allowable temperature range of the battery 50 and increases (decreases as the absolute value) with an increase in state of charge SOC of the battery 50.

The HVECU 70 is configured as a CPU-based microprocessor and includes a ROM configured to store processing programs, a RAM configured to temporarily store data, input/output ports and a communication port, in addition to the CPU, although not being illustrated. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above.

The hybrid vehicle 20 of the embodiment having the above configuration is driven in an electric drive mode (EV drive mode) without rotation of the engine 22 or in a hybrid drive mode (HV drive mode) with rotation of the engine 22.

In the EV drive mode, the HVECU 70 sets a drive torque Td*, based on the accelerator position Acc and the vehicle speed V, sets a value 0 to a torque command Tm1* of the motor MG1, and sets a torque command Tm2* of the motor MG2 such that the drive torque Td* is output to the driveshaft 36 in a range of the input limit Win and the output limit Wout of the battery 50. The HVECU 70 then sends the torque commands Tm1* and Tm2* of the motors MG1 and MG2 to the motor ECU 40. When receiving the torque commands Tm1* and Tm2* of the motors MG1 and MG2, the motor ECU 40 performs switching control of the plurality of switching elements included in the respective inverters 41 and 42, such that the motors MG1 and MG2 are driven with the torque commands Tm1* and Tm2*.

In the HV drive mode, in an accelerator-on state, the HVECU 70 sets a drive torque Td* required for driving (i.e., required for the driveshaft 36), based on the accelerator position Acc and the vehicle speed V, and calculates a drive power Pd* required for driving by multiplying the set drive torque Td* by a rotation speed Nd of the driveshaft 36 (rotation speed Nm2 of the motor MG2). The HVECU 70 subsequently calculates a target power Pe* of the engine 22 by subtracting a charge-discharge required power Pb* of the battery 50 (which takes a positive value when the battery 50 is discharged) from the calculated drive power Pd*. The HVECU 70 then sets a target rotation speed Ne* and a target torque Te* of the engine 22 and the torque commands Tm1* and Tm2* of the motors MG1 and MG2, such that the calculated target power Pe* is output from the engine 22 and that the drive torque Td* (drive power Pd*) is output to the driveshaft 36 in the range of the input limit Win and the output limit Wout of the battery 50. The HVECU 70 sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs operation control of the engine 22 (for example, intake air flow control, fuel injection control and ignition control), such that the engine 22 is operated with the target rotation speed Ne* and the target torque Te*. The motor ECU 40 controls the inverters 41 and 42 in the same manner as described above.

In the HV drive mode, in an accelerator-off state, the HVECU 70 sets a drive torque Td* (basically takes negative values) based on the vehicle speed V, and sets the torque commands Tm1* and Tm2* of the motors MG1 and MG2, such that the drive torque Td* is output to the driveshaft 36 in the range of the input limit Win and the output limit Wout of the battery 50 by either a first braking technique that uses self-sustained operation of the engine 22 and regenerative driving of the motor MG2 or a second braking technique that uses fuel cutting of the engine 22, motoring of the engine 22 by the motor MG1 and regenerative driving of the motor MG2. The HVECU 70 then sends a fuel cutting command or a self-sustained operation command of the engine 22 to the engine ECU 24, while sending the torque commands Tm1* and Tm2* of the motors MG1 and MG2 to the motor ECU 40. When receiving the fuel cutting command, the engine ECU 24 stops the fuel injection control and the ignition control of the engine 22. When receiving the self-sustained operation command, the engine ECU 24 performs operation control of the engine 22 such that the engine 22 is operated in a self-sustained manner. The motor ECU 40 controls the inverters 41 and 42 in the same manner as described above.

Figure 2:
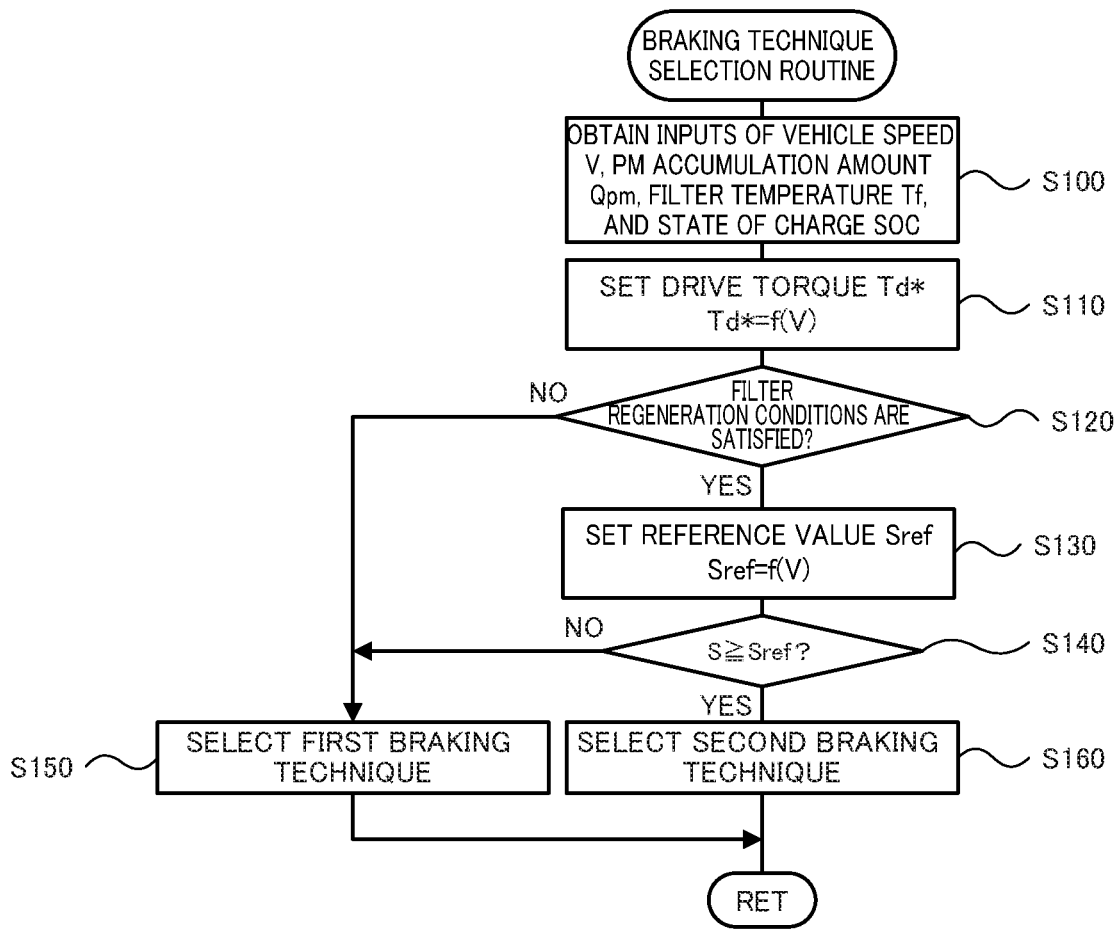
FIG. 2 is a flowchart showing one example of a braking technique selection routine performed by an HVECU.

The following describes operations of the hybrid vehicle 20 of the embodiment configured as described above or more specifically a series of operations when either the first braking technique or the second braking technique described above is selected as the braking technique in the accelerator-off state in the HV drive mode. FIG. 2 is a flowchart showing one example of a braking technique selection routine performed by the HVECU 70. This routine is repeatedly performed in the accelerator-off state.

When the braking technique selection routine of FIG. 2 is triggered, the HVECU 70 first obtains the input data of the vehicle speed V, the PM accumulation amount Qpm, the filter temperature Tf and the state of charge SOC of the battery 50 (step S100). The input vehicle speed V is a value detected by the vehicle speed sensor 88. The PM accumulation amount Qpm and the filter temperature Tf are values that are calculated by the engine ECU 24 and that are input by communication. The state of charge SOC of the battery 50 is a value that is calculated by the battery ECU 52 and that is input by communication.

Figure 3:
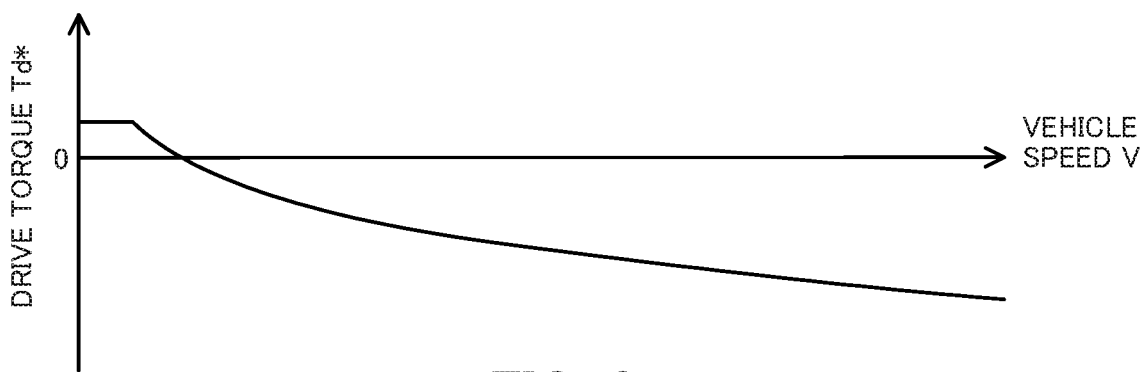
FIG. 3 is a diagram illustrating one example of a drive torque setting map.

After obtaining the input data, the HVECU 70 sets the drive torque Td*, based on the input vehicle speed V (step S110). According to the embodiment, a procedure of setting the drive torque Td* sets in advance a relationship between the vehicle speed V and the drive torque Td*, stores the set relationship in the form of a drive torque setting map into the ROM (not shown), and reads a drive torque Td* corresponding to a given vehicle speed V from this map. FIG. 3 is a diagram illustrating one example of this drive torque setting map. As illustrated, the drive torque Td* is set basically in a negative value range such as to decrease (increase as an absolute value) with an increase in vehicle speed V.

The HVECU 70 subsequently determines whether filter regeneration conditions are satisfied, based on the input PM accumulation amount Qpm and the input filter temperature Tf (step S120). The filter regeneration conditions used herein are conditions that the PM accumulation amount Qpm is equal to or larger than a reference value Qpmref and that the filter temperature Tf is equal to or higher than a reference value Tfref. The reference value Qpmref is a threshold value used to determine whether or not regeneration of the PM filter 25*f* is required and is, for example, a value of 3 g/L, 4 g/L or 5 g/L. The reference value Tfref is a threshold value used to determine whether or not the filter temperature Tf reaches a regenerable temperature that is suitable for regeneration of the PM filter 25*f* and is, for example, 580° C., 600° C. or 620° C.

When it is determined at step S120 that the filter regeneration conditions are not satisfied, the HVECU 70 selects the first braking technique (step S150) and then terminates this routine. In this case, the HVECU 70 performs cooperative control with the engine ECU 24 and the motor ECU 40 to control the engine 22 and the motors MG1 and MG2, such that the drive torque Td* is output to the driveshaft 36 in the range of the input limit Win and the output limit Wout of the battery 50 by the self-sustained operation of the engine 22 and regenerative driving of the motor MG2.

Figure 4:
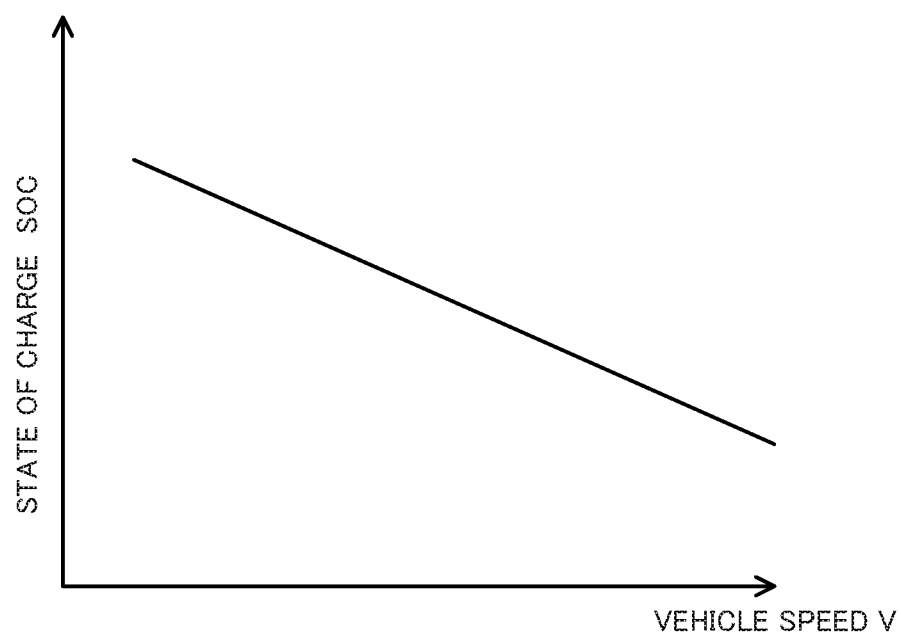
FIG. 4 is a diagram illustrating one example of a reference value setting map.

When it is determined at step S120 that the filter regeneration conditions are satisfied, on the other hand, the HVECU 70 sets a reference value Sref based on the vehicle speed V (step S130) and compares the state of charge SOC of the battery 50 with the set reference value Sref (step S140). The reference value Sref is a threshold value used to determined whether or not selection of the second braking technique to perform fuel cutting of the engine 22 and motoring of the engine 22 by the motor MG1 (power driving of the motor MG1) is likely to excessively decrease the state of charge SOC of the battery 50 and cause overdischarge of the battery 50. According to the embodiment, a procedure of setting this reference value Sref sets in advance a relationship between the vehicle speed V and the reference value Sref, stores the relationship in the form of a reference value setting map into the ROM (not shown), and reads a reference value Sref corresponding to a given vehicle speed V from this map. FIG. 4 is a diagram illustrating one example of this reference value setting map. As illustrated, the reference value Sref is set to decrease with an increase in vehicle speedy. The reason for such setting of the reference value Sref will be described later.

When the state of charge SOC of the battery 50 is equal to or higher than the reference value Sref at step S140, the HVECU 70 selects the second braking technique (step S160) and then terminates this routine. In this case, the HVECU 70 performs cooperative control with the engine ECU 24 and the motor ECU 40 to control the engine 22 and the motors MG1 and MG2, such that the drive torque Td* is output to the driveshaft 36 in the range of the input limit Win and the output limit Wout of the battery 50 by fuel cutting of the engine 22, motoring of the engine 22 by the motor MG1 and regenerative driving of the motor MG2. Such control causes the air (oxygen) to be supplied to the PM filter 25*f* and burn the particulate matter accumulated on the PM filter 25*f* and thereby achieves regeneration of the PM filter 25*f*.

When the state of charge SOC of the battery 50 is lower than the reference value Sref at step S140, on the other hand, the HVECU 70 selects the first braking technique (step S150) and then terminates this routine. In this case, the first braking technique performs self-sustained operation of the engine 22 and performs neither fuel cutting of the engine 22 nor motoring of the engine 22 by the motor MG1 (power driving of the motor MG1). This suppresses the state of charge SOC of the battery 50 from being excessively decreased to cause overdischarge of the battery 50.

The following describes the reason for setting the reference value Sref such as to decrease with an increase in vehicle speed V. When the drive torque Td* is set to decrease (increase as an absolute value) with an increase in vehicle speed V in the accelerator-off state as described above, the higher vehicle speed V is likely to provide the larger torque by regenerative driving of the motor MG2 and provide the larger electric power generated by regenerative driving. Accordingly, at the high vehicle speed V, even when fuel cutting of the engine 22 and motoring of the engine 22 by the motor MG1 (power driving of the motor MG1) are performed, it is unlikely to excessively decrease the state of charge SOC of the battery 50 (it is unlikely to cause overdischarge of the battery 50). Setting the reference value Sref such as to decrease with an increase in vehicle speed V by taking into account the foregoing explanation increases the likelihood of selecting the second braking technique between the first braking technique and the second braking technique at the high vehicle speed V. This more reliably gives the opportunity for regeneration of the PM filter 25*f* at the high vehicle speed V.

As described above, in the case where the drive torque Td* (negative value) is output to the driveshaft 36 accompanied with regenerative driving of the motor MG2 in the accelerator-off state upon satisfaction of the filter regeneration conditions, the hybrid vehicle 20 of the embodiment controls the engine 22 and the motor MG1 such as to perform fuel cutting of the engine 22 and motoring of the engine 22 by the motor MG1 when the state of charge SOC of the battery 50 is equal to or higher than the reference value Sref, while controlling the engine 22 such as to perform the self-sustained operation of the engine 22 when the state of charge SOC of the battery 50 is lower than the reference value Sref. In the former case, such control causes the air (oxygen) to be supplied to the PM filter 25*f* and thereby achieves regeneration of the PM filter 25*f*. In the latter case, such control suppresses the state of charge SOC of the battery 50 from being excessively decreased and thereby suppresses overdischarge of the battery 50.

The hybrid vehicle 20 of the embodiment sets the reference value Sref such as to decrease with an increase in vehicle speed V. According to a modification, the reference value Sref may be set to a fixed value (for example, 40%, 45% or 50%).

The hybrid vehicle 20 of the embodiment performs self-sustained operation of the engine 22 and regenerative driving of the motor MG2 as the first braking technique. According to a modification, the first braking technique may perform rotation stop of the engine 22 and regenerative driving of the motor MG2.

Figure 5:
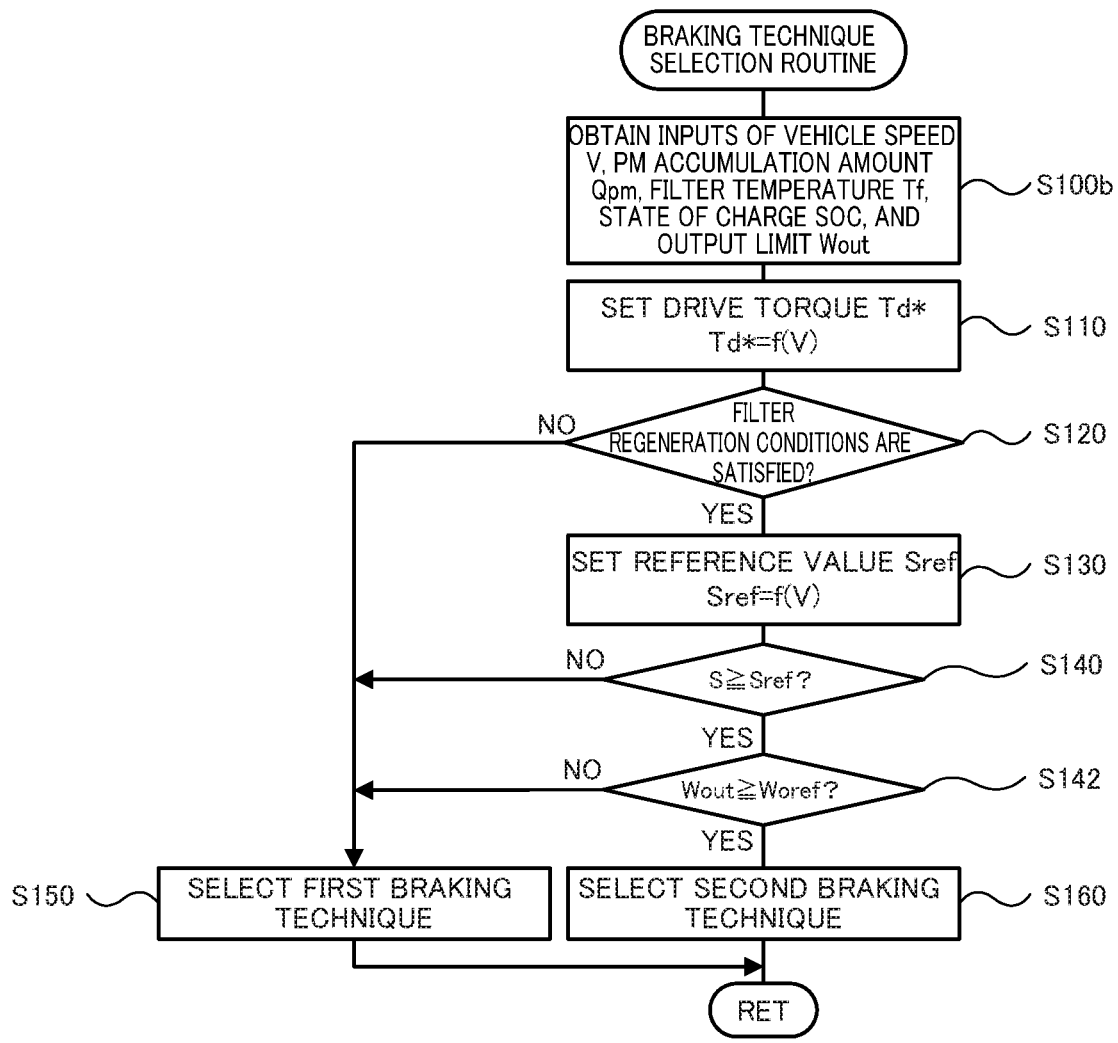
FIG. 5 is a flowchart showing another example of the braking technique selection routine according to a modification.

In the hybrid vehicle 20 of the embodiment, the HVECU 70 performs the braking technique selection routine of FIG. 2 in the accelerator-off state. According to a modification, the HVECU 70 may perform a braking technique selection routine of FIG. 5, instead of the braking technique selection routine of FIG. 2. The braking technique selection routine of FIG. 5 is similar to the braking technique selection routine of FIG. 2, except that the processing of step S100b is performed in place of the processing of step S100 and that the processing of step S142 is added. The like processes in the braking technique selection routine of FIG. 5 to those in the braking technique selection routine of FIG. 2 are expressed by the like step numbers, and their detailed description is omitted.

When the braking technique selection routine of FIG. 5 is triggered, the HVECU 70 obtains the input data of the output limit Wout of the battery 50, in addition to obtaining the input data of the vehicle speed V, the PM accumulation amount Qpm, the filter temperature Tf and the state of charge SOC of the battery 50 like the processing of step S100 in the braking technique selection routine of FIG. 2 (step S100b). The output limit Wout of the battery 50 is a value that is calculated by the battery ECU 52 and that is input by communication. When it is determined at step S140 that the state of charge SOC of the battery 50 is equal to or higher than the reference value Sref, the HVECU 70 subsequently compares the output limit Wout of the battery 50 with a reference value Woref (step S142). When the output limit Wout of the battery 50 is equal to or higher than the reference value Woref, the HVECU 70 selects the second braking technique (step S160) and then terminates this routine. When the output limit Wout of the battery 50 is lower than the reference value Woref, on the other hand, the HVECU 70 selects the first braking technique (step S150) and then terminates this routine.

The reference value Woref is a threshold value used to determine whether or not electric power required for motoring of the engine 22 by the motor MG1 is covered by the electric power from the battery 50 and the electric power generated by regenerative driving of the motor MG2. This reference value Woref may be set to a fixed value or may be set such as to decrease with an increase in vehicle speed V. The latter setting is attributed to that setting the drive torque Td* such as to decrease (increase as an absolute value) with an increase in vehicle speed V as described above is more likely to provide the larger torque by regenerative driving of the motor MG2 and provide the larger electric power generated by regenerative driving at the higher vehicle speed V and accordingly decreases the rate of the electric power discharged from the battery 50 to the total electric power required for motoring of the engine 22 by the motor MG1.

According to this modification, in the case where the state of charge SOC of the battery 50 is equal to or higher than the reference value Sref, the HVECU 70 selects the second braking technique when the output limit Wout of the battery 50 is equal to or higher than the reference value Woref, while selecting the first braking technique when the output limit Wout of the battery 50 is lower than the reference value Woref. According to another modification, in the case where the state of charge SOC of the battery 50 is equal to or higher than the reference value Sref, the HVECU 70 may select the second braking technique when the temperature Tb of the battery 50 is equal to or higher than a reference value Tbref and select the first braking technique when the temperature Tb of the battery 50 is lower than the reference value Tbref. Like the reference value Woref, the reference value Tbref is a threshold value used to determine whether or not the electric power required for motoring of the engine 22 by the motor MG1 is covered by the electric power from the battery 50 and the electric power generated by regenerative driving of the motor MG2. As described above, the output limit Wout of the battery 50 is set such as to decrease with an increase in separation of the temperature Tb of the battery 50 toward the lower side from the allowable temperature range of the battery 50. Accordingly, the comparison between the output limit Wout of the battery 50 and the reference value Woref may be replaced by comparison between the temperature Tb of the battery 50 and the reference value Tbref.

The hybrid vehicle 20 of the embodiment uses the battery 50 as the power storage device. The power storage device used may, however, be a capacitor, instead of the battery 50.

The hybrid vehicle 20 of the embodiment is provided with the engine ECU 24, the motor ECU 40, the battery ECU 52 and the HVECU 70. At least two of these ECUs may be configured as one single electronic control unit.

Figure 6:
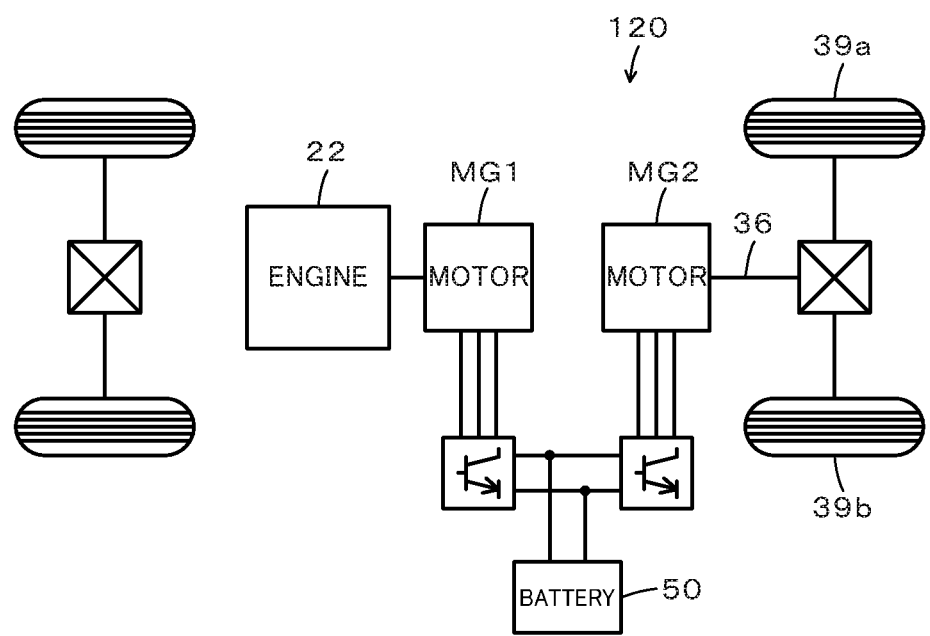
FIG. 6 is a configuration diagram illustrating the schematic configuration of another hybrid vehicle according to a modification.

As shown in FIG. 1, the hybrid vehicle 20 of the embodiment is configured such that the engine 22 and the motor MG1 are connected via the planetary gear 30 with the driveshaft 36 that is linked with the drive wheels 39a and 39b, that the motor MG2 is connected with the driveshaft 36, and that the battery 50 is connected with the motors MG1 and MG2 via the power lines 54. The present disclosure may also be applied to a series-type hybrid vehicle 120 configured such that a motor MG2 is connected with a driveshaft 36 that is linked with drive wheels 39a and 39b, that a motor MG1 is connected with an engine 22, and that a battery 50 is connected with the motors MG1 and MG2 via power lines as shown in FIG. 6. The hybrid vehicle 120 of this configuration controls the motor MG2 such that the drive torque Td* (negative value) is output to the driveshaft 36 by regenerative driving of the motor MG2 in the accelerator-off state upon satisfaction of the filter regeneration conditions. When the state of charge SOC of the battery 50 is equal to or higher than the reference value Sref, the engine 22 and the motor MG1 are controlled such as to perform fuel cutting of the engine 22 and motoring of the engine 22 by the motor MG1. When the state of charge SOC of the battery 50 is lower than the reference value Sref, on the other hand, the engine 22 is controlled such as to perform self-sustained operation or rotation stop of the engine 22. Such control provides similar advantageous effects to those of the embodiment described above.

In the hybrid vehicle of the above aspect, the control device may perform control in the accelerator-off state, such that a higher vehicle speed condition applies a larger braking force to the drive wheels, compared with a lower vehicle speed condition, and the reference value may be set such as to provide a smaller value at a higher vehicle speed than a value at a lower vehicle speed. In the accelerator-off state, the higher vehicle speed condition is likely to provide the larger braking force by regenerative driving of the second motor and provide the larger electric power generated by regenerative driving, with a view to increasing the braking force that is to be applied to the drive wheels, compared with the lower vehicle speed condition. Even when fuel cutting of the engine and motoring of the engine by the first motor are performed, the higher vehicle speed condition is unlikely to excessively decrease the state of charge of the power storage device. By taking into account the foregoing explanation, setting the reference value such as to provide a smaller value at a higher vehicle speed than a value at a lower vehicle speed more reliably gives the opportunity for regeneration of the filter at the high vehicle speed.

In the hybrid vehicle of the above aspect, in the accelerator-off state upon satisfaction of the regeneration condition of the filter, when the state of charge of the power storage device is equal to or higher than the reference value but an allowable output power of the power storage device is lower than a predetermined electric power level, the control device may control the engine such as to perform the self-sustained operation or rotation stop of the engine. This configuration takes into account the possibility that the electric power required for motoring of the engine by the first motor is not coverable by the electric power from the power storage device and the electric power generated by regenerative driving of the second motor, when the power storage device has a small allowable output power.

In the hybrid vehicle of the above aspect, in the accelerator-off state upon satisfaction of the regeneration condition of the filter, when the state of charge of the power storage device is equal to or higher than the reference value but temperature of the power storage device is lower than a predetermined temperature, the control device may control the engine such as to perform the self-sustained operation or rotation stop of the engine. This configuration takes into account the possibility that the electric power required for motoring of the engine by the first motor is not coverable by the electric power from the power storage device and the electric power generated by regenerative driving of the second motor, when the allowable output power of the power storage device is decreased for the purpose of protecting the power storage device at the low temperature of the power storage device.

The following describes the correspondence relationship between the primary elements of the above embodiment and the primary elements of the disclosure described in Summary. The engine 22 of the embodiment corresponds to the "engine", the motor MG1 corresponds to the "first motor", the motor MG2 corresponds to the "second motor", the battery 50 corresponds to the "power storage device", and the HVECU 70, the engine ECU 24 and the motor ECU 40 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

What is claimed is:

1. A hybrid vehicle, comprising:
an engine equipped with a filter that is placed in an exhaust system and that is configured to remove particulate matter;
a first motor connected with an output shaft of the engine;
a second motor connected with drive wheels;
a power storage device configured to transmit electric power to and from the first motor and the second motor; and
a control device configured to control the engine, the first motor and the second motor, wherein
in a case where a braking force is applied to the drive wheels accompanied with regenerative driving of the second motor in an accelerator-off state upon satisfaction of a regeneration condition of the filter,
the control device controls the engine and the first motor such as to perform fuel cutting of the engine and motoring of the engine by the first motor, when a state of charge of the power storage device is equal to or higher than a reference value, and
the control device controls the engine such as to perform self-sustained operation or rotation stop of the engine, when the state of charge of the power storage device is lower than the reference value.

2. The hybrid vehicle according to claim 1,
wherein the control device performs control in the accelerator-off state, such that a higher vehicle speed condition applies a larger braking force to the drive wheels, compared with a lower vehicle speed condition, and
the reference value is set such as to provide a smaller value at a higher vehicle speed than a value at a lower vehicle speed.

3. The hybrid vehicle according to claim 2,
wherein in the accelerator-off state upon satisfaction of the regeneration condition of the filter, when the state of charge of the power storage device is equal to or higher than the reference value but an allowable output power of the power storage device is lower than a predetermined electric power level, the control device controls the engine such as to perform the self-sustained operation or rotation stop of the engine.

4. The hybrid vehicle according to claim 2,
wherein in the accelerator-off state upon satisfaction of the regeneration condition of the filter, when the state of charge of the power storage device is equal to or higher than the reference value but temperature of the power storage device is lower than a predetermined temperature, the control device controls the engine such as to perform the self-sustained operation or rotation stop of the engine.

5. The hybrid vehicle according to claim 1,
wherein in the accelerator-off state upon satisfaction of the regeneration condition of the filter, when the state of charge of the power storage device is equal to or higher than the reference value but an allowable output power of the power storage device is lower than a predetermined electric power level, the control device controls the engine such as to perform the self-sustained operation or rotation stop of the engine.

6. The hybrid vehicle according to claim 1,
wherein in the accelerator-off state upon satisfaction of the regeneration condition of the filter, when the state of charge of the power storage device is equal to or higher than the reference value but temperature of the power storage device is lower than a predetermined temperature, the control device controls the engine such as to perform the self-sustained operation or rotation stop of the engine.

\* \* \* \* \*